United States Patent
Gómez Verdejo

(10) Patent No.: US 11,021,801 B2
(45) Date of Patent: Jun. 1, 2021

(54) RECOVERY OF A METAL FROM PRIMARY AND SECONDARY SULPHURATED MINERALS AND OXIDIZED MINERALS, AND OTHER COMPOSITIONS OF VALUABLE MINERALS

(71) Applicant: QUANTUM MATRIX SPA, Santiago (CL)

(72) Inventor: Guillermo Sebastián Gómez Verdejo, Santiago (CL)

(73) Assignee: Quantum Matrix SPA, Santiago (CL)

( * ) Notice: Subject to any disclaimer, the term of this patent is extended or adjusted under 35 U.S.C. 154(b) by 351 days.

(21) Appl. No.: 16/080,847

(22) PCT Filed: May 20, 2016

(86) PCT No.: PCT/CL2016/050024
§ 371 (c)(1),
(2) Date: Aug. 29, 2018

(87) PCT Pub. No.: WO2017/197540
PCT Pub. Date: Nov. 23, 2017

(65) Prior Publication Data
US 2019/0100846 A1    Apr. 4, 2019

(51) Int. Cl.
| | | |
|---|---|---|
| *C25C 1/12* | (2006.01) | |
| *B01J 19/12* | (2006.01) | |
| *B07C 5/344* | (2006.01) | |
| *C22B 3/02* | (2006.01) | |
| *C22B 3/06* | (2006.01) | |

(Continued)

(52) U.S. Cl.
CPC .......... *C25C 1/12* (2013.01); *B01J 19/12* (2013.01); *B01J 19/123* (2013.01); *B03C 7/06* (2013.01); *B07C 5/344* (2013.01); *C22B 3/02* (2013.01); *C22B 3/06* (2013.01); *C25C 1/20* (2013.01);

(Continued)

(58) Field of Classification Search
CPC ...... C25C 1/12; C25C 1/20; C25C 7/06; B01J 19/12; B01J 19/123; B01J 2219/0875; B01J 2219/1203; B03C 7/06; B07C 5/344
See application file for complete search history.

(56) References Cited

U.S. PATENT DOCUMENTS

| | | | |
|---|---|---|---|
| 4,039,406 A | 8/1977 | Stanley et al. | |
| 4,338,168 A | 7/1982 | Stanley et al. | |
| 2014/0230604 A1* | 8/2014 | Pavlovich | C22B 3/14 |
| | | | 75/300 |

FOREIGN PATENT DOCUMENTS

| | | |
|---|---|---|
| CN | 101214469 A1 | 7/2008 |
| CN | 102253099 A | 11/2011 |

(Continued)

OTHER PUBLICATIONS

International Search Report dated Feb. 16, 2017 during the prosecution of International Patent Application No. PCT/CL2016/050024 (English translation).

(Continued)

*Primary Examiner* — Anthony J Zimmer
*Assistant Examiner* — Ricardo D Morales
(74) *Attorney, Agent, or Firm* — Troutman Pepper Hamilton Sanders LLP

(57) ABSTRACT

A method to separate and recover at least one metal from a source of oxidized and/or primary and secondary sulfide ores by determining and modifying the values of the dielectric constant of the minerals source.

20 Claims, 1 Drawing Sheet

(51) Int. Cl.
*B03C 7/06* (2006.01)
*C25C 1/20* (2006.01)
*C25C 7/06* (2006.01)
(52) U.S. Cl.
CPC ......... *C25C 7/06* (2013.01); *B01J 2219/0875* (2013.01); *B01J 2219/1203* (2013.01)

(56) References Cited

FOREIGN PATENT DOCUMENTS

ES 2351292 A1 2/2011
WO 2013/071455 5/2013

OTHER PUBLICATIONS

Kornev. I, et al. Pulsed electric discharge treatment of uranium leaching solution; A method for accelerated extraction, Hydrometallurgy (2016), 162: 37-41 http://dx.doi.org/10.1016/j.hydromet.2016.02.006.

Labrada-Vazquex, B. et al. Efecto de la lixiviacion como tratemiento previo en la obtencion de carbon activo de concha de coco por el metodo de activacion fisica. Technolgia Quimica (2011) XXXI, 3, 5-14. (available at http://www.redalyc.org/articulo.oa?id=445543774001ISSN:0041-8420.) (See Abstract.).

* cited by examiner

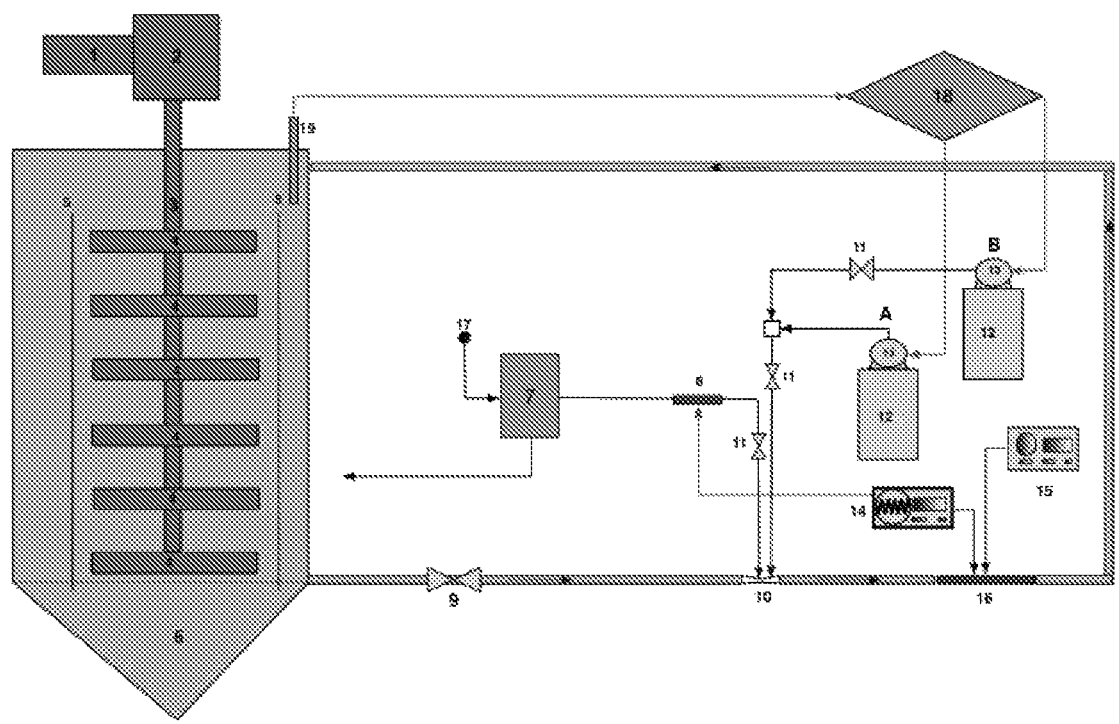

RECOVERY OF A METAL FROM PRIMARY AND SECONDARY SULPHURATED MINERALS AND OXIDIZED MINERALS, AND OTHER COMPOSITIONS OF VALUABLE MINERALS

CROSS-REFERENCE TO RELATED APPLICATIONS

This is a U.S. national phase application under 35 U.S.C. § 371 of International Patent Application No. PCT2016/050024, filed May 20, 2016 which is incorporated by reference in its entirety.

FIELD OF TECHNOLOGY

The present invention relates to the hydrometallurgy field referring to the leaching of primary or secondary oxide or sulfide ores of copper, silver and gold, and other metals in order to provide a PLS (Pregnant Leach Solution) solution. The method of the present invention allows recovering a metal from primary and secondary oxide and sulfide ores, and other composition of valuable ores.

BACKGROUND

The state of the art describes many heap-leaching processes and leaching in reactors to dissolve concentrate oxide and/or sulfide ores of copper, silver and gold or from a combination of oxide and sulfide ores using acid oxidizing leaching.

Most copper ores only contain a small percentage of copper together with other valuable ores, the rest of the ore being a number of ores, mainly silicates or oxide ores with no significant value. The average grade of copper ores in the 21th century is lower than 0.6% copper, with a proportion of ores of economic value under 2% of the ore volume.

The first stage of metallurgical processes applied in the art corresponds to a crushing and milling stage to produce particles below 100 micrometers, consisting in individual mineral phases. These particles are later separated to remove the negligible ore and then perform a procedure to separate the minerals physically. The separation process of these minerals depends on whether the minerals are oxidized or sulfurized.

For oxide minerals, generally a hydrometallurgical separation process is performed which is based on the soluble nature of the minerals.

In the case of sulfide ores, a flotation procedure is performed to separate the ore from the negligible ore. In this last case, submitting the concentrate to a number of thermal solid-gas type reactions is later necessary, which may include oxidation, reduction, chlorination, sulfation and pyrohydrolysis, so that the sulfide may convert into oxide and allow the release of sulfur as sulfur dioxide gas. This procedure is certainly useful, but, notwithstanding this, it is an important source of atmospheric contamination and requires an extremely high amount of energy resources.

Attempts have been made to make the sulfide concentrate leachable under relatively less severe conditions, under which the sulfide would only oxidize to elementary sulfide and not during the whole process to sulfate. These attempts include the previous treatment of the concentrate before the oxidation phase under pressure in order to make the sulfide concentrate more easily leachable, and the leaching of the concentrate in the presence of chloride ions, as described in U.S. Pat. No. 4,039,406 for example. In this process, the values of copper in the concentrate transform into a solid basic sulfate of copper, from which the values of copper shall be later recovered, as described in the U.S. Pat. No. 4,338,168. In the process described in U.S. Pat. No. 4,039,406, a significant amount (20-30%) of the sulfide present in the ore or concentrate continues to oxidize to sulfate, this generating a greater demand of oxygen during leaching under pressure, as well as the generation of sulfuric acid. This is especially favorable for low grade concentrates, where the S/Cu ratio is high.

One of the best known techniques to recover ores as gold and silver is leaching with cyanide, with the most used method being "Cyanide Heap Leaching Mining" incorporating hydrochloric acid into the reactors under controlled conditions of temperature and pressure. There have been huge advances in the application of biotechnological processes for the recovery of those metals.

The state of the art also describes a number of methodologies for the extraction of copper sulfide ores, such as ACTIVOX, CECL, MT Gordon and REDOX ALL P. Most of these techniques use temperature and pressure, achieving an efficiency that ranges between 95% and 98% and using a stirred closed reactor. The main characteristics of said methodologies are described in Table 1.

TABLE 1

Leaching technologies of sulfide ores and copper concentrates

| Tech-nology | T° C. | Pres-sure (At) | Grain size distribu-tion (μm) | Effi-cien-cy | Comments | Reactor and time |
|---|---|---|---|---|---|---|
| Activox | 090-110 | 10-12 | 05-10 | >95% | Uses fine and leaches chalcopyrite | Stirred, 10 hours |
| CECL | 140-150 | 10-12 | 37 | >95% | Leaches chalcopyrite with chlorides | Stirred, 10 hours |
| MT Gordon | 085-090 | 08-09 | 100 | >97% | Leaches chalcocite | Stirred, 10 hours |
| REDOX ALL P | 200-230 | 30-40 | 37 | >98% | Leaches chalcopyrite | Stirred, 10 hours |

Reference: "*Copper leaching from primary sulfides: Options for biological and chemical extraction of copper*", D. Dreisinger In hydrometallurgy processes, the chemical reactions developed are affected in their speed and mechanism by such factors as: temperature, pressure, use of UV light, electrolysis, electrodialysis, electrocoagulation, photoionization and different types of chemical catalysts that act by modifying the speed reaction and its trajectory. Also, a number of biological mechanisms have been used in hydrometallurgy processes to leach ore, the so-called bioleaching processes. This aspect is very important for hydrometallurgy, since in many cases the speed of a reaction moving towards balance, rather than the balance condition itself, is what determines the design and operation of mining processes.

The document CL 02036-1998 describes a method to recover copper in a hydrometallurgical process through leaching of copper concentrates with chloride ions, precipitation of $Cu_2O$ using NaOH and reduction of $Cu_2O$ with hydrogen to form elementary copper. The document CL 00448-2001 describes a method to recover copper from copper-containing raw materials and leaching with a composition that comprises magnesium chloride. The document CL 01113-1991 describes a method to leach copper ores comprising the dissolution in a leaching solution of a fluoroaliphatic surfactant. The document CL 01888-1998 describes a method to recover copper from leaching solution through precipitation with sulfur and/or copper sulfide with low content of copper, forming copper sulfide, using a reduction agent and in the presence of ammoniac as copper ion complexing agent at room temperature.

SUMMARY

The present invention provides a new alternative to the traditional methods of extraction of metals by leaching, mainly for the extraction of copper, gold and silver, as well as an alternative to leaching applied to oxidized minerals and primary and secondary sulfide ores. The method of the present invention settles the technical problem of high costs and operating difficulties associated with a poor performance, environmental problems due to the use of high temperatures and pressure mainly in the case of sulfide ores, as well as problems related to handling and the resulting environmental hazards from cyanide.

The present invention relates to a procedure to separate and recover at least a metal from primary and secondary oxide and/or sulfide ores, as for example concentrates of copper, silver and gold among others from a leaching agent, where the leaching agent has a greater dielectric constant than the dielectric constant of the solute (ore and concentrate). The method of the present invention allows providing a copper concentrate solution (PLS), which is suitable for the electrolytic extraction through the extraction with solvents.

Additionally, the present invention provides a system to separate and recover at least a metal from primary and secondary oxide ores and sulfide ores, concentrates of copper, silver and gold from a leaching agent comprising a recirculation unit that includes:

An encircling stirring reactor (6);
An oxygen concentrator and ozonizer (7);
An UV unit (8);
At least one container for chemical reagents (12);
A generating set and radio frequency amplifier (14);
An inductor unit (15); and
An induction coil (16).

BRIEF DESCRIPTION OF DRAWINGS

FIG. 1 shows a flowchart of a separation process according to an embodiment of the invention that is suitable for the treatment of copper ore or concentrates.

DETAILED DESCRIPTION

The present invention relates to a procedure to separate and recover at least a metal from oxidized and/or primary and secondary sulfide minerals, as for example concentrates of copper, silver and gold among others from a leaching agent, where the leaching agent has a greater dielectric constant than the dielectric constant of the solute (ore and concentrate). The method of the present invention allows providing a copper concentrate solution (PLS), which is suitable for the electrolytic extraction through the extraction with solvents.

Additionally, the present invention provides a system to separate and recover at least a metal from primary and secondary oxide ores and sulfide ores, concentrates of copper, silver and gold from a leaching agent comprising a recirculation unit that includes:

An encircling stirring reactor (6);
An oxygen concentrator and ozonizer (7);
An UV unit (8);
At least one container of chemical reagents (12);
A generating set and radio frequency amplifier (14);
An inductor unit (15); and
An induction coil (16).

According to the present invention, "mineral concentrate" means a product rich in metals obtained by applying separation and concentration processes such as flotation. Metals are "concentrated" from the ore containing them and the rest is thrown away as neutralized tailings. Later, these metals are extracted from concentrates through pyrometallurgical and hydrometallurgical processes in smelters and refineries.

According to the present invention, as copper oxide ores it is understood those originated in the decomposition and oxidation of sulfide ores. They were the first ores exploited. The main ones are malachite, azurite, chrysocolla, cuprite, brochantite.

According to the invention, the sulfide ores correspond to mixtures of copper and iron sulfides combined with compounds of other different elements. The most important ones are: chalcopyrite, bornite, enargite and tetrahedrite.

The sulfide ore is the main source of primary copper. After being extracted in mines, the sulfide ores are crushed and milled in order to get the proper grain size distribution in next stages, where aggregates from fractions rich in copper are separated through flotation, smelting and electro-refining processes.

The present invention provides a method to separate and recover at least one metal from oxidized minerals and primary and secondary sulfide mineral, comprising the following stages:

i. Providing in a reactor (6) a source of oxidized minerals and/or primary and secondary sulfide mineral, where said minerals source has a controlled granulometry;

ii. Determining the value of the dielectric constant of the mineral minerals source by electromagnetic, chemical, physical and/or mineralogical characterization;

iii. Providing an acid leaching composition (Composition A) with a dielectric constant at least 2% to 10% greater than the dielectric constant of the mineral source;

iv. Modifying the value of the dielectric constant of the mineral minerals source by incorporating to the reactor (6) an aqueous acid composition (Composition B) having a dielectric constant at least 2% to 10% greater than the dielectric constant of the mineral source;

v. Contacting the mineral minerals source with the acid leaching composition (Composition A) under controlled conditions of pressure and temperature in the reactor (6) in order to form a mixture between the leaching composition and the ore source, where said reactor (6) forms part of a system comprising a generating set and radio frequency amplifier (14), an inductor unit (15); and an induction coil (16) allowing to providing magnetic induction and radio frequency to the mixture, vi. Submitting the mixture to stirring and recirculation of the leaching composition through the system;

vii. Providing the mixture with a supply oxygen and ozone through an oxygen concentrator and ozonizer (7), where said supply has been previously submitted to treatment with ultraviolet light generated by an UV unit (8);

viii. Allowing the dissolution of the metal and the migration of said metal to the leaching composition in order to provide a composition comprising the solubilized metal (PLS);

ix. Through an electrochemical separation technique, extracting the metal from the PLS solution.

The method of the present invention is mainly based on controlling the value of the dielectric constant of the mineral source in order to provide an acid leaching composition (Composition A) and an aqueous acid composition (Composition B), which are suitable to optimize the extraction performance of the minerals. This stage mainly comprises the following steps:

Determining the value of the dielectric constant of the mineral minerals source (oxidized ore or primary or secondary sulfide) by electromagnetic, chemical, physical and/or mineralogical characterization.

Providing a leaching composition (Composition A) with a dielectric constant greater than the dielectric constant of the mineral source, where the acid leaching composition preferably has a dielectric constant between 5 and 10% greater than the dielectric constant of the mineral source.

Providing an aqueous acid composition (Composition B) before incorporating the leaching composition, so that to perform a first adjustment of the dielectric constant. Alternatively, an aqueous acid composition (Composition B) is provided after incorporating the leaching composition in order to perform a first adjustment of the dielectric constant or simultaneously.

Since ore leaching is a phenomenon of mass transfer occurring when a solid gets in contact with a leaching agent, a dissolution process of the element you would like to extract should occur and then go from the solid ore to the leaching agent. For a substance to dissolve another substance, the interaction forces of the electromagnetic type of the solvent (leaching agent) should be greater than those of the solute (solid mineral). This dissolution has kinetics or speed in which the chemical reaction occurs, this being why providing a leaching agent is necessary modeled in such a way that the mixture of acids and salts allow the dissolution of the solute.

The determination of the dielectric constant is made through a study of the dielectric constant variation according to the grain size distribution of the ore source. Surprisingly, the inventors have found out that the dielectric constant varies according to the grain size distribution due to the volume of holes or porosity of the material. Once the dielectric constant of the mineral source is known, it is possible to provide a leaching composition that allows solubilizing the solute in such a way that the dissolution forces are greater than the forces of solute to cause said dissolution. To this effect, methodologies of the effect of the variation of dielectric constant in mixtures of chemicals are used. The basis of those compositions is aqueous solutions, where the ionic force of the quality of water to be used has an effect on the final dielectric constant.

The dielectric constant, also known as static relative permittivity, measures the amount of electrostatic flow that a material can concentrate. The dielectric constant can be measured as follows:

1. First, the capacity of a testing condenser is measured in vacuum $C_i$ (initial capacity) (or in air if a small mistake is accepted).
2. Using the same condenser and the same distance between its plates, the capacity is measured with the dielectric inserted between them $C_f$ (final capacity).

The dielectric constant of a medium, also known as relative permittivity, can be calculated as:

$$\varepsilon_r = \frac{C_f}{C_i}$$

In an embodiment of the invention, the mineral minerals source is preferably selected from the group formed by gold sulfide ores; silver sulfide ores; copper sulfide ores; secondary sulfide ores of pure copper concentrates; secondary sulfide ores of copper concentrates with arsenic; secondary sulfides of white metal; secondary sulfides of smelting powders; secondary sulfides of electrostatic precipitator powders; secondary sulfides of gravel with copper content; secondary sulfides of tailings with content of copper, concentrates, nickel ore, white metal and/or mixtures thereof. The process is also used in leaching copper oxide ores, such as malachite, azurite, chrysocolla, cuprite and others. For the dissolution to occur, the relative dielectric constant of the leaching solution should be greater than the ore dielectric constant, keeping the stoichiometry of chemical reactions. The interaction of the electromagnetic energy with the matter is governed by the characteristics of the material and the frequency of the electromagnetic field. This dependence is due to the dielectric permittivity of the material being affected by energy loss due to the relaxation mechanisms that operate at different frequencies. In a mineral rock or in different ores, concentrates, white metal, etc., the relaxation mechanisms are attributed to the materials making up the grains of sand, to water in pores and to wettability phenomena in the interfaces.

In a preferred embodiment of the invention, the mineral minerals source is a source of oxidized minerals and it has a dielectric constant within the range of 5 to 55. In another preferred embodiment of the invention, the mineral minerals source is a source of sulfide minerals and it has a dielectric constant within the range of 50 to 100.

In table 2 below, the values of the dielectric constant of ores according to the invention are illustrated as example:

TABLE 2

Dielectric constant of sundry ores

| Ore | Formula | $\varepsilon_r$ |
| --- | --- | --- |
| Apatite | $Ca_5(PO_4)_3cl$ | 5.72 |
| Argentite | $Ag_2S$ | 81.7 |
| Arsenopyrite | $FeAsS$ | 83.4 |
| Bauxite | $AlO_3(OH)$ | 10.85 |
| Bornite | $Cu_5FeS_4$ | 92.4 |
| Chalcocite | $Cu_2S$ | 87.4 |
| Chalcopyrite | $CuFeS_2$ | 96.4 |
| Chrysocolla | $Cu_4H_4(OH)_8Si_4O_{10} \cdot nH_2O$ | 11.32 |
| Covellite | $CuS$ | 81.3 |
| Cuprite | $Cu_2O$ | 16.20 |
| Enargite | $Cu_3AsS_4$ | 82.6 |
| Tenorite | $CuO$ | 18.10 |

In a preferred embodiment of the invention, the mineral source is a source of oxidized minerals selected from the group composed of malachite, azurite, chrysocolla, cuprite and brochantite.

In a preferred embodiment of the invention, the minerals source is a source of sulfide minerals selected from the group composed of chalcopyrite, bromite, enargite and tetrahedrite.

In a preferred embodiment, the dielectric constant of the leaching composition (composition A) is within the range of 80 to 90, preferably around 85. In a preferred embodiment, the dielectric constant of the aqueous acid composition (composition B) is within the range of 74.5 to 85, preferably around 80.

In a preferred embodiment, the acid leaching composition (Composition A) comprises at least a diluted acid in an amount between 1 and 15% w/w, preferably between 3 and 8% w/w, and more preferably around 5%, where said diluted acids are selected from the group composed of nitric acid, sulfuric acid, hypochlorous acid and/or mixtures thereof, and others which, by being mixed, allow having the dielectric constant desired. In a preferred embodiment, the acid aqueous composition (Composition B) comprises a mixture of acids in a concentration of 5% w/v to 20% w/v, where the acids are preferably selected from chlorhydric, nitric and sulfuric acid mixed with an oxidizing agent as hydrogen peroxide or acid sulfuric peroxide or mixed with ferric chloride or sodium chloride.

According to the present invention, the minerals source has an average diameter of particle between 200 and 500 meshes, preferably between 200 and 100 meshes, more preferably around 150 meshes. Preferably, the minerals source is subject to a crushing and milling process before its incorporation to the reaction reactor in order to get the average size of particle indicated above.

The minerals source is previously subject to a crushing and milling process preferably through a milling procedure in a jaws and plates mill.

In an embodiment of the invention, the application of magnetic induction corresponds to an induction between 100 Gauss and 1,500 Gauss performed through a column, preferably of pyrex glass with ringed copper wire operating as a coil. The application of radio frequency corresponds to a radio frequency between 500 KHz and 3 MHz induced through platinum and carbon electrodes. The application of radio frequency corresponds to a radio frequency between 500 KHz and 3 MHz induced through platinum and carbon electrodes through a generator of functions and a wave amplifier.

According to an embodiment of the present invention, the particular leaching of copper concentrates is performed with a surface exothermal reaction before the leaching stage by incorporating an acid leaching composition. To this effect, according to FIG. 1, in the reactor (6), the source of minerals is top loaded and compositions A and B are incorporated in order to adjust the values of the dielectric constant within the parameters set in the procedure. This stage of the process lasts between 5 and 20 minutes, preferably around 10 minutes.

Additionally, the present invention provides a system to separate and recover at least one metal from oxidized ores and primary and secondary sulfide ores, copper, silver and gold concentrate from a leaching agent comprising a recirculation unit that includes:

An encircling stirring reactor (6);
A blower unit (17);
An oxygen concentrator and ozonizer (7);
An UV unit (8);
At least one container of chemical reagents (12);
A generating set and radio frequency amplifier (14);
An inductor unit (15); and
An induction coil (16).

Preferably, the reactor (6) comprises a concentric cylinder (5) inside. Additionally, inside said concentric cylinder (5) there are multiple stirrer blades (4) connected to a shaft (3) and in communication with a motor reducer (2). Said motor reducer (2) is preferably connected to a frequency variator (1). The blower unit (17) is connected to said oxygen concentrator and ozonizer (7), where said oxygen concentrator and ozonizer (7) is connected to the UV unit (8).

In an embodiment, the system of the invention also comprises a Venturi (10) in communication with the lower part of the reactor (6) and in communication with the UV unit (8), with at least one container of chemical reagents (12) and an induction coil (16). Between said Venturi (10) and the reactor (6) there is a recirculation flow control valve (9). Additionally, between the Venturi (10) and the UV unit (8), and between the Venturi (10) and at least one container of chemical reagents (12) there is at least one valve (11). In an embodiment, the at least one container of chemical reagents (12) comprises a pump (13) in connection with said at least one valve (11).

In a preferred embodiment of the invention, the generating set and radio frequency amplifier (14) is communicated with the UV unit (8) and the induction coil (16), where the induction coil (16) is in turn in communication with the upper part of the reactor (6). Preferably, the induction coil (16) is formed by copper wires.

In a system according to the invention, the blower unit is in communication with the reactor (6). In another embodiment, the magnetic field generated by the inductor unit ranges between 100 and 300 Gauss and the generating set and Radio Frequency amplifier (14) generates waves of sinusoidal geometric form, sawtooth and square. Preferably, the UV unit comprises an UV tube of 190 nm to 154 nm.

Preferably, the reactor (6) consists in a coated cylindrical tank that endures strongly oxidized reactions and acid or basic pH. Additionally, the motor reducer (2) operates in the range of 20 to 250 rpm. In another embodiment, the frequency variator (1) according to the invention operates within the range between 100 KHz and 1 GHz.

In a preferred embodiment of the invention, the system comprises an automatic control of the dielectric constant of the ore source. Preferably the reactor (6) comprises an electrodynamic sensor (19), which purpose being sending an electric signal that is received by an autonomous programmer (PLC) (18). This programmer processes the signal and keeps the dielectric constant that should exist in the reactor (6). To this effect, the electrodynamic sensor instructs the acid aqueous compositions and leaching compositions through the flow of the pump (13) to dose the products, so that to keep a dielectric constant according to the dissolution design of the solute.

According to the present invention, the reactor provides stirring at a constant speed and allows the recirculation of the leaching agent, which goes through a vertical column having Rashig rings where air, oxygen or ozone is incorporated and which previously goes through an ultraviolet light system and connects to the column and the reactor. The vertical column is wrapped in a coil that provides magnetic induction and radio frequency.

The leaching procedure forms a leached solution or PLS (Pregnant Leach Solution) that extracts dissolved ions of gold, silver, copper, nickel, iron, lead, zinc, arsenic, silicon, antimony, aluminum, cobalt and other acid soluble ions from the ore or concentrate to form a PLS with variable ion charge depending on its initial concentration of ore or concentrate. Through an electrochemical separation technique the extraction of the metal from the PLS solution is completed, where said technique can be any technique known in the state of the art.

In a preferred embodiment of the invention, the method comprises the incorporation to the reactor (6) of the oxidizing agent prepared under the procedure of the invention. Then, the frequency variator (1) is activated according to the speed to be communicated according to the prior kinetic studies. Then, the motor reducer (2), the shaft (3) and the stirrer blades (4) are activated. This movement makes the flow to rise up the concentric cylinder to the reactor (5) and to keep en encircling movement in the reactor (6). This way, the stirring allows the flow to rise up, to mix and to make an optimal contact between the solid and the liquid. Later, the air injection (17) is activated through a blower unit. The air enters an oxygen concentrator and ozonizer (7). The oxygen and air go through a 190 nm UV unit (8). The recirculation flow control valve (9) is activated delivering the flow, which goes through a Venturi (10) and an induction coil (16). For difference of pressure, the Venturi (10) extracts the ozone/oxygen and the mixture of compositions A and B in order to keep the dielectric constant of the liquid. The mixture of compositions A and B is dosed by pumps (13), which extract the reagents from the corresponding containers (12), which passing is made it possible by the valves (11). A Radio Frequency generating set (14) provides a Radio Wave in the UV unit (8) and the induction coil (16). Also through the induction unit (15) a magnetic field is applied as applicable. Once the process has achieved the steady state, it can be operated by stirring the reactor at proper speed in order to ensure the encircling mixture and the solid-liquid contact.

Although the examples of application could be the best known, many other processes may take advantage of leaching with a methodology under that described herein and thus optimizing the performance of the products obtained, except for copper ores. Thus, if a process uses part of or all the technology of the present invention, it should remain under the scope of the present invention.

EXAMPLES

Example 1

A sample screened in a tyler sieve with 0.147 mm opening with an average size of particle of 100 mesh was used. For this experience, 10 grams of gold concentrate was considered of a grade of 22.1 g/Ton (22.1 mg/Kg). The dielectric constant of the solute (gold concentrate) was measured through electromagnetic techniques with the application of electric field and Radio Frequency, using the equation of mixtures of dielectric constant and tables (Josann L. RosnNnor, ANDDuornv T. Surrn, Rensselaer Polytechnic Institute, Troy, Nueva York), which result achieved $\varepsilon r=79.7$. 250 mL of a leaching solution were prepared with a dielectric constant of $\varepsilon s1=81.7$ at 20° C. based on a mixture of sulfuric acid at 0.5%, with 1% of chlorhydric acid and 2% of sodium hypochlorite (expressed in relation to the total weight of the leaching composition). The solute is added to the reactor (gold concentrate) and incorporated to the concentrate of 3 mL of peroxydisulfuric acid 2.5% prepared in situ with a value of $\varepsilon s2=80.3$ 3 mL. The mixture solution prepared at $\varepsilon s1=81.7$ at 20° C. is added to the reactor and stirred at 150 rpm through the encircling system for 10 minutes. Then, according to the diagram of FIG. 1, the leaching composition A is recirculated through the unit for 1 hour.

From the results obtained, a recovery of gold is obtained of above 96% according to that indicated in Table 3:

TABLE 3

| N | Mass grams | Gold grade g/Ton | Volume liters | [Au] Initial mg/l | [Au] Final mg/l | % Recovery Au % | Time Hours | T ° C. |
|---|---|---|---|---|---|---|---|---|
| 1 | 10 | 22.1 | 0.5 | 0.442 | 0.428 | 96.83% | 1 | 27.1 |
| 2 | 10 | 22.1 | 0.5 | 0.442 | 0.430 | 97.28% | 1 | 28.5 |
| 2 | 10 | 22.1 | 0.5 | 0.442 | 0.431 | 97.50% | 1 | 28.8 |

Example 2: Leaching of Copper from Concentrate of Sulfide Copper

A sample screened in a tyler sieve with 0.147 mm opening with an average size of particle of 100 mesh was used. For this experience, 10 grams of copper concentrate was considered with 60% of chalcopyrite with a grade of 24.2%. The dielectric constant of the solute (sulfide copper concentrate) was measured as indicated in the example 1, which result achieved $\varepsilon r=81.6$. 250 mL of a leaching solution were prepared with a dielectric constant of $\varepsilon s1=82.47$ at 20° C. based on a mixture of sulfuric acid at 2.0%, with 0.5% of nitric acid. Them, the solute is added to the reactor (sulfide copper concentrate) and the concentrate is etched with 2.5 mL of a composition comprising 50% of nitric acid with a concentration of 20% with hydrogen peroxide at 30%, prepared en situ $\varepsilon s2=82.7$. The mixture solution prepared at $\varepsilon s1=82.4$ at 20° C. is added to the reactor and stirred at 120 rpm through the encircling system for 10 minutes. Then, according to the diagram of FIG. 1, the leaching composition is recirculated through the unit for 1 hour.

From the results obtained, a recovery of copper was obtained of above 95% according to that indicated in Table 4:

TABLE 4

| N | Mass grams | Cu grade % | Volume liters | [Cu] Initial mg/l | [Cu] Final mg/l | % Recovery Cu % | Time Hours | T ° C. |
|---|---|---|---|---|---|---|---|---|
| 1 | 10 | 24.2 | 0.5 | 4.84 | 4.76 | 98.34% | 1 | 26.2 |
| 2 | 10 | 24.2 | 0.5 | 4.84 | 4.74 | 97.93% | 1 | 29.1 |
| 2 | 10 | 24.2 | 0.5 | 4.84 | 4.79 | 98.96% | 1 | 30.1 |

Example 3: Copper Leaching from White Metal

A sample screened in a tyler sieve with 0.147 mm opening with an average size of particle of 100 mesh was used. For this experience, 10 grams of white metal was considered of a copper grade of 76.87%. The dielectric constant of the solute (copper from white metal) was measured, which result achieved $\varepsilon r=76.4$. 250 mL of a leaching solution were prepared with a dielectric constant of $\varepsilon s1=79.3$ at 20° C. based on sulfuric acid at 2.5%. The solute is added to the reactor (gold concentrate) and the concentrate is etched with 1.5 mL of a nitric mixture at 10% with hydrogen peroxide at 20%, prepared in situ with a value of $\varepsilon s2=82.7$ mL. The mixture solution prepared at $\varepsilon s1=79.3$ at 20° C. is added to the reactor and stirred at 120 rpm through the encircling system for 10 minutes. Then, according to the diagram of FIG. 1, the leaching composition is recirculated through the unit for 1 hour.

From the results obtained, a recovery of copper was obtained of above 98% according to that indicated in Table 5:

TABLE 5

| N | Mass grams | Cu grade % | Volume liters | [Cu] Initial mg/l | [Cu] Final mg/l | % Recovery Cu % | Time Hours | T °C. |
|---|---|---|---|---|---|---|---|---|
| 1 | 10 | 76.87 | 0.5 | 15.374 | 15.21 | 98.93% | 1 | 28.5 |
| 2 | 10 | 76.87 | 0.5 | 15.374 | 15.23 | 99.06% | 1 | 29.1 |
| 2 | 10 | 76.87 | 0.5 | 15.374 | 15.18 | 98.74% | 1 | 29.5 |

The invention claimed is:

1. A method to separate and recover at least one metal from a source of oxidized and/or primary and secondary sulfide ores, the method comprising the following stages:
   i. providing in a reactor a source of oxidized and/or primary and secondary sulfide ores, where said ores source has a controlled granulometry by a size selection by a sieve;
   ii. determining the value of the dielectric constant of the ores source by electromagnetic, chemical, physical and/or mineralogical characterization;
   iii. providing an acid leaching composition A with a dielectric constant of at least 2% to 10% greater than the dielectric constant of the ore source;
   iv. modifying the value of the dielectric constant of the ores source by incorporating to the reactor an aqueous acid composition B having a dielectric constant of at least 2% to 10% greater than the dielectric constant of the ore source;
   v. contacting the ores source with the acid leaching composition A under controlled conditions of pressure and temperature in the reactor in order to form a mixture between the leaching composition A and the source of ores, where said reactor forms part of a system comprising a generating set and radio frequency amplifier, allowing to providing radio frequency to the mixture recirculating in the reactor,
   vi. submitting the mixture to stirring and recirculation of the leaching composition A through the system;
   vii. providing the mixture with a supply oxygen and ozone through an oxygen concentrator and ozonizer, where said supply has been previously submitted to treatment with ultraviolet light generated by an UV unit, which can optionally provide radio frequency to the gas corning from the ozonizer;
   viii. allowing the dissolution of the metal and the migration of said metal to the leaching composition in order to provide a composition comprising the solubilized metal (PLS);
   ix. through an electrochemical separation technique, extracting the metal from the PLS solution.

2. The method according to claim 1, wherein the acid leaching composition A comprises at least a diluted acid in an amount between 0.5% and 15% w/w where said diluted acids are selected from the group composed of nitric acid, sulfuric acid, hypochlorous acid and/or mixtures thereof.

3. The method according to claim 1, wherein the acid aqueous composition B comprises a mixture of acids in a concentration of 5% w/v to 20% w/v, where the acids are preferably selected from chlorhydric, nitric and sulfuric acid mixed with an oxidizing agent as hydrogen peroxide or acid sulfuric peroxide.

4. The method according to claim 1, wherein the ores source is selected from the group consisting of gold sulfide ores; silver sulfide ores; copper sulfide ores; secondary sulfide ores of pure copper concentrates; secondary sulfide ores of copper concentrates with arsenic; secondary sulfides of white metal; secondary sulfides of smelting powders; secondary sulfides of electrostatic precipitators; slag; secondary sulfides of gravel with copper content; secondary sulfides of tailings with content of copper and copper oxide ores selected from malachite, azurite, chrysocolla, cuprite and others.

5. The method according to claim 1, wherein the electrodynamic sensor instructs the compositions A and/or B through the flow of a pump connected to at least one container of chemical reagents to dose the products, so that to keep a dielectric constant according to the dissolution design of the source of ores.

6. The method according to claim 1, wherein in stage v, the system also comprises an inductor unit and an induction coil allowing to provide a magnetic induction to the mixture between the leaching composition A and the ores source.

7. A system to separate and recover at least one metal from primary and secondary oxide ores and sulfide ores according to the method of claim 1, wherein the system comprises a recirculation unit composed at least of:
   an encircling stirring reactor to provide a source of oxidized ores and/or primary and/or secondary sulfurized ores having controlled granulometry by a size selection by a sieve;
   an oxygen concentrator and ozonizer allowing to supplying oxygen and ozone to the mixture of the reactor;
   a UV unit allowing the treatment with UV light of the oxygen and ozone prior to supplying them to the reactor, and optionally radio frequency;
   at least one container of chemical reagents, so that to allow their incorporation to the reactor;
   a generating set and radio frequency amplifier allowing to provide a radio frequency to the mixture recirculating in the reactor.

8. The system according to claim 7, wherein said reactor comprises a concentric cylinder inside.

9. The system according to claim 7, wherein inside said concentric cylinder there are multiple stirrer blades connected to a shaft and in communication with a motor reducer.

10. The system according to claim 7 further comprising a blower unit connected to said oxygen concentrator and ozonizer.

11. The system according to claim 7, wherein said oxygen concentrator and ozonizer is connected to the UV unit.

12. The system according to claim 7 further comprising a Venturi in communication with the lower part of the reactor and in communication with the UV unit, with at least one container of chemical reagents and an induction coil.

13. The system according to claim 12, wherein between the Venturi and the reactor there is a control valve of the recirculation flow.

14. The system according to claim 12, wherein between the Venturi and the UV unit, and between the Venturi and at least one container of chemical reagents there is at least one valve.

15. The system according to claim 7, wherein the at least one container of chemical reagents comprises a pump in connection with said at least one valve.

16. The system according to claim 7 further comprising an induction unit and an induction coil.

17. The system according to claim 16, wherein the generating set and radio frequency amplifier is communicated with the UV unit and the induction coil.

18. The system according to claim 7 further comprising an electrodynamic sensor in electric connection with an autonomous programmer (PLC).

19. The system according to claim 7, wherein the electrodynamic sensor is in connection with the pump of the at least one container of chemical reagents.

20. The system according to claim 7, wherein the electrodynamic sensor is located inside the reactor.

* * * * *